(12) United States Patent
Matsuura et al.

(10) Patent No.: US 12,741,264 B2
(45) Date of Patent: Sep. 22, 2026

(54) HUMIDITY CONTROLLING MATERIAL

(71) Applicant: SHARP KABUSHIKI KAISHA, Sakai City (JP)

(72) Inventors: Kyoko Matsuura, Sakai City (JP); Yuusuke Shimizu, Sakai City (JP); Tsuyoshi Kamada, Sakai City (JP); Tetsuya Ide, Sakai City (JP); Sho Ochi, Sakai City (JP)

(73) Assignee: SHARP KABUSHIKI KAISHA, Sakai City (JP)

(*) Notice: Subject to any disclaimer, the term of this patent is extended or adjusted under 35 U.S.C. 154(b) by 419 days.

(21) Appl. No.: 17/924,302

(22) PCT Filed: Feb. 3, 2021

(86) PCT No.: PCT/JP2021/003849
§ 371 (c)(1),
(2) Date: Nov. 9, 2022

(87) PCT Pub. No.: WO2021/229867
PCT Pub. Date: Nov. 18, 2021

(65) Prior Publication Data

US 2023/0182111 A1 Jun. 15, 2023

(30) Foreign Application Priority Data

May 14, 2020 (JP) ................................ 2020-085034

(51) Int. Cl.
*B01J 20/26* (2006.01)
*B01J 20/04* (2006.01)
(Continued)

(52) U.S. Cl.
CPC .......... *B01J 20/261* (2013.01); *B01J 20/046* (2013.01); *B01J 20/28016* (2013.01);
(Continued)

(58) Field of Classification Search
CPC .................... B01J 20/261; B01J 20/046; B01J 20/28016; B01J 20/28038; B01J 20/267; B01J 20/2805; B01J 20/26; B01D 53/26; B01D 53/28; B32B 5/022; B32B 5/024; B32B 27/12; B32B 27/306; B32B 3/14; B32B 2260/02; B32B 2260/021; B32B 2250/40;
(Continued)

(56) References Cited

U.S. PATENT DOCUMENTS

| | | | | |
|---|---|---|---|---|
| 5,415,907 | A | 5/1995 | Inoue et al. | |
| 5,510,166 | A | 4/1996 | Inoue et al. | |
| 2005/0209352 | A1* | 9/2005 | Dairoku | B01J 20/26 521/50 |
| 2010/0005968 | A1 | 1/2010 | Endo et al. | |

FOREIGN PATENT DOCUMENTS

| | | | |
|---|---|---|---|
| CN | 101535048 | A | 9/2009 |
| CN | 101995447 | A | 3/2011 |

(Continued)

*Primary Examiner* — Matthew D Matzek
(74) *Attorney, Agent, or Firm* — ScienBiziP, P.C.

(57) ABSTRACT

The present disclosure provides a humidity controlling material with a high humidity controlling rate. The humidity controlling material includes a resin material and a humidity controlling liquid. The resin material contains a resin. The humidity controlling liquid impregnates the resin. The humidity controlling liquid absorbs or discharges moisture.

4 Claims, 2 Drawing Sheets

(51) Int. Cl.

| | |
|---|---|
| ***B01J 20/28*** | (2006.01) |
| ***B32B 5/02*** | (2006.01) |
| ***B32B 27/12*** | (2006.01) |
| ***B32B 27/30*** | (2006.01) |
| *B32B 3/14* | (2006.01) |

(52) U.S. Cl.

CPC ......... *B01J 20/28038* (2013.01); *B32B 5/022* (2013.01); *B32B 5/024* (2013.01); *B32B 27/12* (2013.01); *B32B 27/306* (2013.01); *B32B 3/14* (2013.01); *B32B 2260/02* (2013.01); *B32B 2260/021* (2013.01)

(58) Field of Classification Search

CPC ..... B32B 2260/046; B32B 3/28; B32B 9/005; B32B 9/045; B32B 21/08; B32B 27/08; B32B 27/10; B32B 27/18

USPC .......................................................... 442/181

See application file for complete search history.

(56) References Cited

FOREIGN PATENT DOCUMENTS

| | | | | | |
|---|---|---|---|---|---|
| CN | 110654074 | A | | 1/2020 | |
| JP | S54136570 | A | | 10/1979 | |
| JP | S58216936 | A | | 12/1983 | |
| JP | S62165547 | U | | 10/1987 | |
| JP | H03181311 | A | | 8/1991 | |
| JP | H0478415 | A | | 3/1992 | |
| JP | H08117546 | A | | 5/1996 | |
| JP | H10258229 | A | | 9/1998 | |
| JP | 2013104030 | A | * | 5/2013 | |
| JP | 2013158668 | A | | 8/2013 | |
| JP | 2018075526 | A | * | 5/2018 | |
| KR | 20130119181 | A | * | 10/2013 | ............. G01N 21/81 |
| TW | I381001 | B | * | 1/2013 | |
| WO | WO-2017057607 | A1 | * | 4/2017 | ............. B01D 53/28 |
| WO | 2019043977 | A1 | | 3/2019 | |

* cited by examiner

HUMIDITY CONTROLLING MATERIAL

TECHNICAL FIELD

The present disclosure relates to humidity controlling materials. The present application claims the benefit of priority to Japanese Patent Application, Tokugan, No. 2020-085034 filed on May 14, 2020, the entire contents of which are incorporated herein by reference.

BACKGROUND ART

Patent Literature 1, as an example, describes an example of humidity controlling liquid. The humidity controlling liquid described in Patent Literature 1 could in some cases fail to sufficiently increase the humidity controlling rate per unit time ("humidity controlling rate").

CITATION LIST

Patent Literature

Patent Literature Japanese Unexamined Patent Application Publication, Tokukaihei, No. 8-117546

SUMMARY OF INVENTION

Technical Problem

The present disclosure has a primary object to provide a humidity controlling material that has a high humidity controlling rate.

Solution to Problem

The present disclosure, in one aspect thereof, is directed to a humidity controlling material including a resin material and a humidity controlling liquid. The resin material contains a resin. The humidity controlling liquid impregnates the resin. The humidity controlling liquid absorbs or discharges moisture.

DESCRIPTION OF EMBODIMENTS

The following will describe a preferred embodiment of the present disclosure. Note however that the embodiment below is a mere example and does not at all limit the present disclosure.

Embodiment 1

Figure 1:
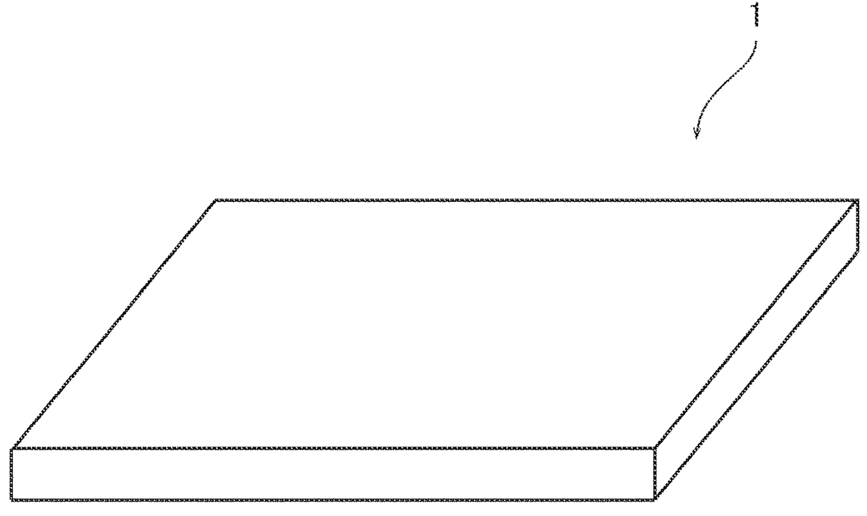
FIG. 1 is a schematic perspective view of a humidity controlling material in accordance with Embodiment 1.

FIG. 1 is a schematic perspective view of a humidity controlling material 1 in accordance with the present embodiment. Referring to FIG. 1, the humidity controlling material 1 is shaped like a rectangular sheet in a plan view.

The humidity controlling material 1 contains a resin material and a humidity controlling liquid.

The resin material contains a resin and a support. The support supports the resin.

The support serves to retain the shape of the humidity controlling material 1. The shape of the support practically dictates the shape of the humidity controlling material 1 in the present embodiment. In other words, the support and the humidity controlling material 1 have substantially the same shape. The support is therefore shaped like a sheet. For instance, when one wants to shape the humidity controlling material like a particle or a block, the shape of the support can be determined in accordance with the desirable shape of the humidity controlling material 1 (e.g., like a particle or a block).

The support may be, for example, a porous body having continuous bubbles. The porous body may be, for example, a nonwoven fabric, a woven fabric, or a foamed body.

The support may be flexible. The support may be deformable. In other words, the support may be capable of being maintained in any shape (e.g., bent shape or curved shape).

The resin is supported by the support.

The resin is preferably a water-absorbing resin. Specifically, the resin is preferably a resin that can be impregnated with the humidity controlling liquid.

The resin may be either an ionic resin or a nonionic resin. Specific examples of the ionic resin include alkali metal salts of polyacrylic acids and starch-acrylate graft polymers. Specific examples of the alkali metal salts of polyacrylic acids include sodium polyacrylate.

Specific examples of the nonionic resin include vinyl acetate copolymers, maleic anhydride copolymers, polyvinyl alcohols, and polyalkylene oxides.

The humidity controlling liquid impregnates the resin contained in the resin material. The amount of the humidity controlling liquid impregnating the resin is preferably greater than or equal to 1 part by weight and less than or equal to 1,000 parts by weight per 100 parts by weight of the resin.

The humidity controlling liquid is a liquid that discharges or absorbs moisture. Specifically, the humidity controlling liquid is a liquid that absorbs moisture when the relative humidity is above a prescribed humidity range and that discharges moisture when the relative humidity is below the prescribed humidity range.

Note that the humidity controlling liquid may impregnate not only the resin, but also the support supporting the resin.

Note that the term, "humidity control," refers to such adjustment of relative humidity as to cause the relative humidity to approach a prescribed humidity range. Specifically, as an example, supposing that the prescribed relative humidity is equal to 50% RH, the humidity controlling material absorbs moisture (water) when the relative humidity is above 50% RH and discharges moisture (water) when the relative humidity is below 50% RH. The prescribed relative humidity range is typically correlated with the substance of the humidity controlling material. Specifically, for example, the prescribed relative humidity range is correlated with the moisture content of the humidity controlling liquid. The prescribed humidity range may be, for example, greater than or equal to 20% RH and less than or equal to 80% RH.

The humidity controlling liquid preferably contains a polyhydric alcohol and a metal salt.

Specific examples of the polyhydric alcohol include glycerin, propanediol, butanediol, pentanediol, trimethylolpropane, butanetriol, ethylene glycol, diethylene glycol, and triethylene glycol. Especially preferred among these examples are glycerin and like poly hydric alcohols with three or more hydroxy groups. Note that the polyhydric alcohol may at least partially constitute a dimer or a polymer.

Note that the humidity controlling liquid may contain a single polyhydric alcohol alone or two or more polyhydric alcohols.

The metal salt in the humidity controlling liquid preferably contains an alkali metal element and a halogen element. In other words, the humidity controlling liquid preferably contains a halide of an alkali metal element.

Specific examples of the metal salt containing an alkali metal element and a halogen element include calcium chloride, lithium chloride, magnesium chloride, potassium chloride, sodium chloride, zinc chloride, aluminum chloride, lithium bromide, calcium bromide, potassium bromide, sodium hydroxide, and sodium pyrrolidone carboxylate. Any one of these metal salts may be used alone alternatively, two or more of them may be used in any combination. Especially preferred among these metal salts is lithium chloride.

Note that the humidity controlling liquid may contain a metal salt in solid form or dissolved in a solvent such as a polyhydric alcohol.

The metal salt in the humidity controlling liquid preferably has a concentration of, for example, greater than or equal to 1 wt % and less than or equal to 50 wt % and more preferably has a concentration of, for example, greater than or equal to 5 wt % and less than or equal to 20 wt %.

The humidity controlling liquid may further contain a material other than the polyhydric alcohols and the metal salts. The humidity controlling liquid may contain, for example, water, a ketone, an organic solvent such as an amide group-containing solvent, a saccharide, and/or a humectant.

Specific examples of the amide group-containing organic solvent include formamide and acetamide.

Specific examples of the saccharide include sucrose, pullulan, glucose, xylose, fructose, mannitol, and sorbitol.

Examples of the humectant include 2-methacryloyloxyethyl phosphorylcholine (MPC), betaine, hyaluronic acid, and collagen.

The humidity controlling material 1 preferably further includes an indicator. The indicator changes color on the basis of the moisture content of the humidity controlling liquid. When the humidity controlling material 1 includes the indicator, the humidity controlling material 1 can change color as the moisture content of the humidity controlling liquid changes in response to a change in the relative humidity. Therefore, a change in the relative humidity can be recognized by observing the color of the humidity controlling material 1. Note that the indicator may be dissolved in, for example, the humidity controlling liquid.

The indicator is not limited in any particular manner and may be, for example, a reversible pH indicator or cobalt chloride.

Examples of preferably used pH indicators include methyl purple, methyl yellow, bromophenol blue, Congo red, methyl orange, bromocresol green, methyl red, litmus, bromocresol purple, bromothymol blue, phenol red, thymol blue, phenolphthalein, triarylmethane derivatives, fluoran derivatives, pyrazolone derivatives, azo derivatives, and xanthene derivatives.

Note that in the present disclosure, the humidity controlling material 1 may contain a single type of indicator, but preferably contains a plurality of types of indicators, in which case the plurality of types of indicators preferably includes a plurality of types of indicators that change color at different pH values. That can increase the variations of colors that the indicators can assume in response to a change in the pH value of the humidity controlling liquid, thereby enabling more rigorous recognition of the relative humidity.

Meanwhile, for example, when one wants the humidity controlling material to absorb moisture, the humidity controlling liquid content of the humidity controlling material is preferably increased with a view to increasing an absorbable moisture content. Therefore, the humidity controlling liquid is preferably used alone with a view to increasing an absorbable moisture content. However, since the humidity controlling liquid is a liquid, it is difficult to sufficiently increase the surface-to-volume ratio. Therefore, it is difficult to sufficiently increase the humidity controlling rate when the humidity controlling liquid is used alone.

In the present embodiment, the resin in the resin material is impregnated with the humidity controlling liquid. Therefore, it is possible to provide the humidity controlling material 1 with a high surface-to-volume ratio. Thus, it is possible to increase the rate per unit time at which moisture is absorbed or discharged. Therefore, it is possible to provide the humidity controlling material 1 with a high humidity controlling rate.

In the humidity controlling material 1, the resin in the resin material is supported by the sheet-shaped support. Therefore, it is possible to further increase the surface-to-volume ratio of the humidity controlling material 1 in comparison with, for example, a spherical support. Therefore, it is possible to provide the humidity controlling material 1 with an even higher humidity controlling rate.

Note that the support can be flexible if the support is made of a nonwoven fabric or a woven fabric. Therefore, it is possible to provide a humidity controlling material that can be deformed into various shapes. In contrast, if the support is made of a porous body such as a foam agent, the support exhibits high stiffness. Therefore, it is possible to provide a humidity controlling material with excellent stability in shape.

In the humidity controlling material 1, the resin is a water-absorbing resin. Therefore, it is possible to suitably impregnate the resin with the humidity controlling liquid. The resin preferably contains a nonionic resin, especially, for example, with a view to further increasing the amount of the impregnating humidity controlling liquid including a polyhydric alcohol. Meanwhile, with a view to lowering manufacturing cost, the resin preferably contains an ionic resin.

Embodiment 2

Embodiment 1 has discussed examples of the humidity controlling material 1 including a support. The present disclosure is however not limited to these examples. The humidity controlling material may not include a support.

Figure 2:
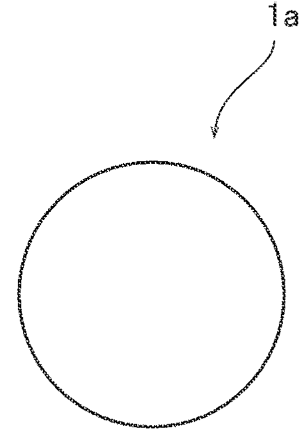
FIG. 2 is a schematic front view of a humidity controlling material in accordance with Embodiment 2.

FIG. 2 is a schematic front view of a humidity controlling material 1*a* in accordance with Embodiment 2.

The humidity controlling material 1*a* shown in FIG. 2 includes no support. The humidity controlling material 1*a* includes a resin material impregnated with a humidity controlling liquid and an indicator. It is possible to increase the surface-to-volume ratio of the humidity controlling material 1*a*, which includes no support, by, for example, using a resin material that is capable of retaining shape without being supported by a support. Therefore, it is possible to provide the humidity controlling material 1*a* with a high humidity controlling rate.

The humidity controlling material 1*a* in accordance with the present embodiment is shaped like a particle. Note that the resin material with no support is not necessarily shaped like a particle. The resin material with no support may be shaped, for example, like a block or like a sheet.

Note that the resin material, the humidity controlling liquid, and the indicator in accordance with the present embodiment are substantially the same as those in Embodiment 1. The description of the resin material, the humidity controlling liquid, and the indicator in Embodiment 1 therefore applies to the present embodiment.

Embodiment 3

Figure 3:
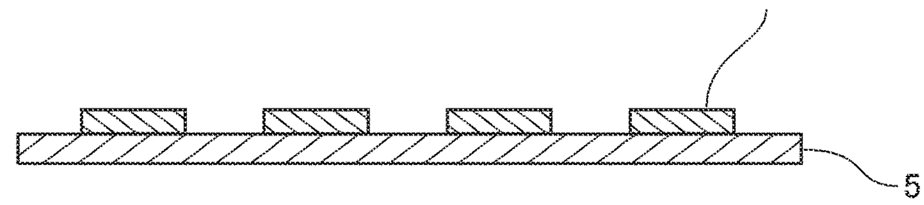
FIG. 3 is a schematic cross-sectional view of a humidity controlling material in accordance with Embodiment 3.

FIG. 3 is a schematic cross-sectional view of a humidity controlling material 1*b* in accordance with Embodiment 3.

Referring to FIG. 3, there may be provided pieces of the humidity controlling material 1*b* separated by intervals on a base member 5.

The base member 5 may be either flexible or inflexible. The base member 5 may be a porous body of, for example, a resin material, a glass material, a ceramic material, paper, or wood.

The base member 5 does not necessarily have any particular shape. The base member 5 may be shaped, for example, like a slab, like a curved plate, or like a wavy plate. Additionally, the base member 5 may be either a casing for housing the humidity controlling material 1*b* or a frame like a picture frame. In addition, the base member 5 may be shaped like, for example, a tube capable of containing the humidity controlling material 1*b* therein.

The provision of the base member 5 can in some cases facilitate the fixing of the humidity controlling material 1*b*. In addition, for example, the use of the flexible base member 5 can in some cases facilitate the positioning of the humidity controlling material 1*b* in variously shaped spaces.

Embodiment 4

Figure 4:
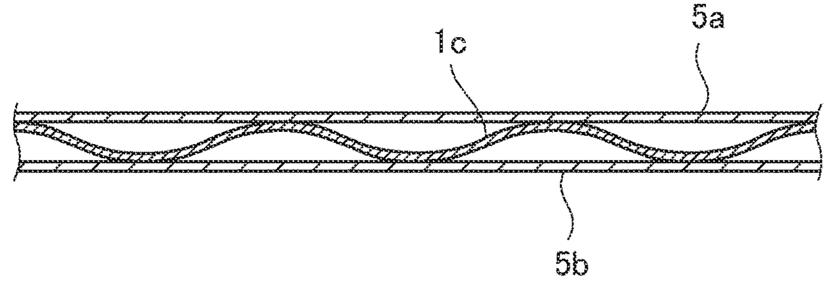
FIG. 4 is a schematic cross-sectional view of a humidity controlling material in accordance with Embodiment 4.

FIG. 4 is a schematic cross-sectional view of a humidity controlling material 1*c* in accordance with Embodiment 2.

The previous embodiment has discussed an example where the humidity controlling material is shaped like a slab. The present disclosure is however not limited to such an example. The humidity controlling material may be shaped, for example, like a curved plate.

As an example, in Embodiment 4 shown in FIG. 4, the humidity controlling material 1*c* is wavy in a side view. The wavy humidity controlling material 1*c* is disposed between a first base member 5*a* and a second base member 5*b*. In such cases, it is possible to increase the surface area per unit volume of the humidity controlling material 1*c*. Therefore, it is possible to achieve a higher humidity controlling rate.

Embodiment 5

Figure 5:
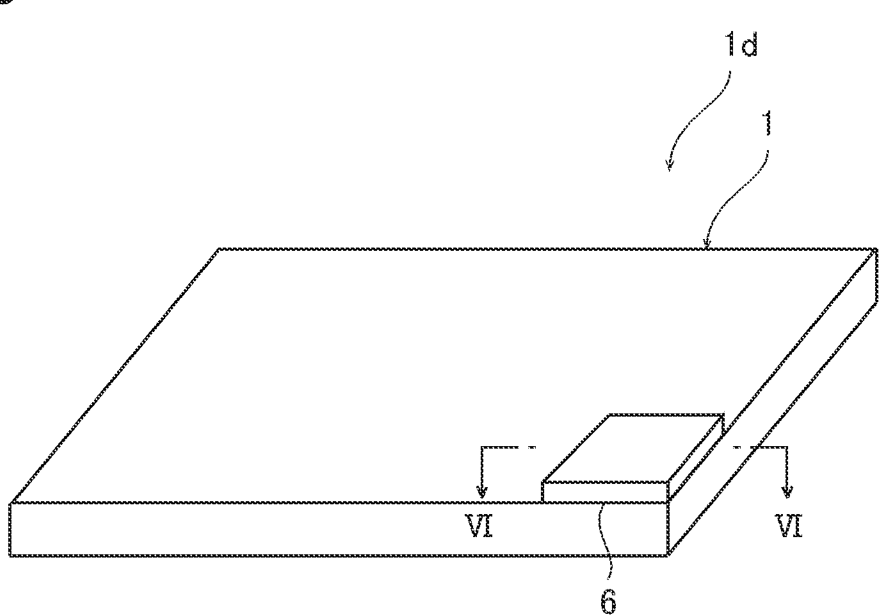
FIG. 5 is a schematic perspective view of a humidity controlling material in accordance with Embodiment 5.
Figure 6:
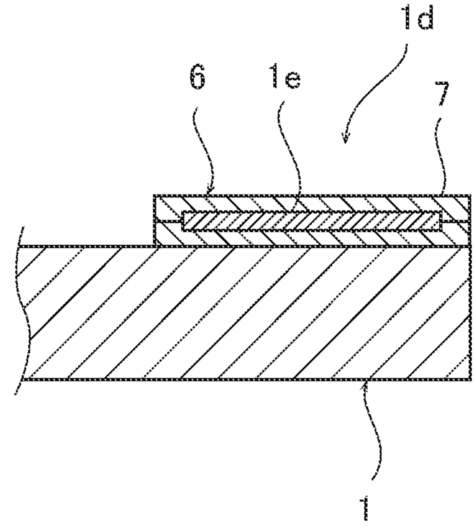
FIG. 6 is a schematic cross-sectional view taken along line VI-VI.

FIG. 5 is a schematic perspective view of a humidity controlling material 1*d* in accordance with Embodiment 5. FIG. 6 is a schematic cross-sectional view taken along line VI-VI.

Referring to FIGS. 5 and 6, the humidity controlling material 1*d* includes the humidity controlling material 1 described in Embodiment 1 and an indication portion 6.

The indication portion 6 is disposed on the top face of the humidity controlling material 1. The indication portion 6 is smaller than the humidity controlling material 1. The indication portion 6 is rectangular, but does not necessarily have any particular shape.

Referring to FIG. 6, the indication portion 6 includes a transparent film 7 and a humidity controlling material 1*e*. The humidity controlling material 1*e* is disposed in the transparent film 7. In other words, the humidity controlling material 1*e* is sealed with the transparent film 7.

The transparent film 7 is permeable to light and moisture. The transparent film 7 may be made of, for example, polyethylene, polypropylene, polyethylene terephthalate, or polystyrene.

The humidity controlling material 1*e* includes no support similarly to Embodiment 2. Specifically, the humidity controlling material 1*e* includes a resin material, a humidity controlling liquid, and an indicator.

In the present embodiment, although the resin in the humidity controlling material 1 is supported by a support (nonwoven fabric), the resin in a resin material 1*e* in the indication portion 6 is not supported by a support. The resin material 1*e* is disposed in the transparent film 7 and visible. Therefore, the color of the indicator in the resin material 1*e* is easily recognizable.

Other Variation Examples

The foregoing embodiments have discussed humidity controlling materials including an indicator. The present disclosure is however not limited to this configuration. The humidity controlling material, for example, does not necessarily include an indicator.

The invention claimed is:

1. A humidity controlling material comprising:
a resin;
a humidity controlling liquid impregnating the resin to absorb or discharge moisture; and
an indicator, wherein,
the indicator changes color with a moisture content of the humidity controlling liquid,
the indicator is dissolved in the humidity controlling liquid,
the resin is capable of retaining a shape of the humidity controlling material upon moisture absorption,
the humidity controlling material is shaped like a particle,
the humidity controlling liquid contains polyhydric alcohol and metal salt,
the polyhydric alcohol contains glycerin,
the metal salt contains lithium chloride, and
the resin is an ionic resin.

2. The humidity controlling material according to claim 1, wherein the resin is a water-absorbing resin.

3. The humidity controlling material according to claim 1, wherein the resin contains sodium polyacrylate.

4. The humidity controlling material according to claim 1, wherein the indicator includes a pH indicator.

* * * * *